United States Patent
Harb

(10) Patent No.: US 8,718,538 B2
(45) Date of Patent: *May 6, 2014

(54) REAL-TIME REMOTE PURCHASE-LIST CAPTURE SYSTEM

(76) Inventor: Joseph Harb, Woodinville, WA (US)

(*) Notice: Subject to any disclaimer, the term of this patent is extended or adjusted under 35 U.S.C. 154(b) by 1110 days.

This patent is subject to a terminal disclaimer.

(21) Appl. No.: 11/850,627

(22) Filed: Sep. 5, 2007

(65) Prior Publication Data

US 2008/0114480 A1 May 15, 2008

Related U.S. Application Data

(60) Provisional application No. 60/865,585, filed on Nov. 13, 2006.

(51) Int. Cl.
*H04H 40/00* (2008.01)

(52) U.S. Cl.
USPC .............. 455/3.06; 455/185.1; 455/186.1; 705/27.1

(58) Field of Classification Search
USPC .......... 455/550.1, 186.1, 185.1, 556.1, 456.3, 455/3.06
See application file for complete search history.

(56) References Cited

U.S. PATENT DOCUMENTS

| | | | |
|---|---|---|---|
| 5,898,910 A | 4/1999 | Miyake | |
| 6,252,367 B1 | 6/2001 | Sakamoto et al. | |
| 6,481,628 B2 | 11/2002 | Lion et al. | |
| 6,623,136 B1 | 9/2003 | Kuo | |
| 6,650,534 B2 | 11/2003 | Tree | |
| 6,799,201 B1 | 9/2004 | Lee | |
| 6,845,360 B2 | 1/2005 | Jensen | |
| 6,915,176 B2 | 7/2005 | Novelli et al. | |
| 7,062,528 B2 | 6/2006 | Deguchi | |
| 7,107,234 B2 | 9/2006 | Deguchi | |
| 7,127,454 B2 | 10/2006 | Deguchi | |
| 7,158,943 B2 | 1/2007 | van der Riet | |
| 7,190,971 B1 | 3/2007 | Kawamoto | |
| 7,302,243 B2 | 11/2007 | Tarbouriech | |
| 7,908,172 B2 | 3/2011 | Corts | |
| 8,296,195 B2 * | 10/2012 | Harb | 705/27.1 |
| 8,310,985 B2 * | 11/2012 | Harb | 370/328 |
| 2001/0055391 A1 | 12/2001 | Jacobs | |
| 2002/0082901 A1 | 6/2002 | Dunning et al. | |
| 2004/0034560 A1 | 2/2004 | Mathis | |
| 2004/0210943 A1 | 10/2004 | Philyaw | |

(Continued)

FOREIGN PATENT DOCUMENTS

WO 2007092463 8/2007

OTHER PUBLICATIONS

International Searching Authority USPTO; International Search Report and Written Opinion; Jan. 8, 2009; 11 pages.

(Continued)

*Primary Examiner* — Magdi Elhag
(74) *Attorney, Agent, or Firm* — Stolowitz Ford Cowger LLP

(57) ABSTRACT

A portable device is used to capture, in real time, data sufficient to identify a product or service promoted, or a music track played, on a broadcast medium such as radio. The device determines a current frequency setting of a nearby radio by short-range broadcast of a brief audio-frequency signature so as to form a feedback path from the radio sufficient to determine the frequency or station currently playing. The captured data is communicated to a services server to enable quick and convenient purchase of the desired product or service.

17 Claims, 7 Drawing Sheets

(56) References Cited

U.S. PATENT DOCUMENTS

| | | |
|---|---|---|
| 2004/0214525 A1 | 10/2004 | Ahn |
| 2005/0060350 A1 | 3/2005 | Baum et al. |
| 2005/0154599 A1* | 7/2005 | Kopra et al. ............... 705/1 |
| 2005/0216855 A1 | 9/2005 | Kopra et al. |
| 2006/0143016 A1 | 6/2006 | Jones |
| 2006/0253874 A1 | 11/2006 | Stark et al. |
| 2006/0265731 A1 | 11/2006 | Matsuda |
| 2007/0043829 A1 | 2/2007 | Dua |
| 2007/0061215 A1 | 3/2007 | Waites |
| 2007/0100766 A1 | 5/2007 | Healy et al. |
| 2007/0142055 A1* | 6/2007 | Toivanen et al. ............ 455/450 |
| 2007/0143778 A1 | 6/2007 | Covell et al. |
| 2007/0149114 A1 | 6/2007 | Danilenko |
| 2007/0232223 A1 | 10/2007 | Bilange |
| 2007/0239895 A1 | 10/2007 | Alperin et al. |
| 2007/0244750 A1 | 10/2007 | Grannan et al. |
| 2007/0265979 A1 | 11/2007 | Hangartner |
| 2007/0294096 A1 | 12/2007 | Randall |
| 2008/0147487 A1 | 6/2008 | Hirshberg |
| 2008/0318529 A1 | 12/2008 | Harb |
| 2010/0161420 A1 | 6/2010 | Mandel |

OTHER PUBLICATIONS

Vranica, Suzanne "NBC's Olympic Test: Counting All the Games' Viewers," Wall Street Journal, Jul. 7, 2008.

Beaumont, Claudine, "Google G1 Phone Will Teach Users How to Play the Guitar and Make the Perfect Martini," Telegraph.co.uk, Date Oct. 24, 2008.

Olsen, Stefanie, Will consumers warm up to CATs?, CNET News. Http://news.cnet.com/Will-consumers-warm-up-to-CATs/2100-1017_3-244055.html, Aug. 3, 2000.

PR Newswire: "Alchemdeia and Digimarc Form Strategic Partnership to Manage Online Content," Oct. 23, 2000, Proquest #62834302, 4 pages.

Digimarc Corporation Website: Internet Archive Wayback Machine, www.archive.org, May 2001, 3 pages.

Stolowitz Ford Cowger LLP List of Related Matters dated Dec. 23, 2011.

* cited by examiner

What's in my Quu?

This is where description text goes this is for placement this is just for placement only this is just for Step 1 Select Theme ▶ Step 2 Review & Purchase

Music  600

DOWNLOAD: iTunes ▼    BUY CD

| Song Title | SONG | ALBUM | ALBUM | Ship to... | Radio Station | | State | City | | Date & Time | |
|---|---|---|---|---|---|---|---|---|---|---|---|
| I Still Haven't found... | ✓ | ✓ | ✓ | | 103.7 | KMTT | WA ▼ | Seattle | ▼ | 05/04/07 6:15 AM | ▲ |
| With Or With Out You | ✓ | ✓ | ✓ | Ship to... | 103.7 | KMTT | WA ▼ | Seattle | ▼ | 05/04/07 7:45 AM | |
| Get Me Outta Here | ✓ | ✓ | ✓ | | 98.5 | KDRK | OR ▼ | Bend | ▼ | 05/04/07 9:02 AM | |
| One Tree Hill | ✓ | ✓ | ✓ | | 105.2 | ROCR | OR ▼ | Bend | ▼ | 05/03/07 5:05 PM | |
| But I Might Die Tonight | ✓ | ✓ | ✓ | | 89.5 | KDMT | OR ▼ | Portland | ▼ | 05/01/07 5:15 PM | |
| Elvis Costello | ✓ | ✓ | ✓ | | 89.5 | KDMT | OR ▼ | Portland | ▼ | 04/28/07 2:15 PM | |
| Forty Licks | ✓ | ✓ | ✓ | | 89.5 | KDMT | OR ▼ | Portland | ▼ | 04/25/07 1:25 PM | ▼ |

Transcripts  630

DOWNLOAD: .mp3 ▼    BUY CD

| Title | | CD | Ship to... | Radio Station | | State | City | | Date & Time | |
|---|---|---|---|---|---|---|---|---|---|---|
| Living in a War zone, Life in Iraq | ✓ | ✓ | Ship to... | 94.9 | KUOW | WA ▼ | Seattle | ▼ | 05/04/07 6:15 AM | ▲ |
| Nano Technology is the future | ✓ | ✓ | | 103.7 | KMTT | WA ▼ | Seattle | ▼ | 05/04/07 7:45 AM | |

Products  650

| Item | Seller | BUY | QTY | Ship to... | Radio Station | | State | City | | Date & Time | |
|---|---|---|---|---|---|---|---|---|---|---|---|
| Cabernet Merlot, 2002 | Columbia Valley | ✓ | | | 103.7 | KMTT | WA ▼ | Seattle | ▼ | 05/04/07 6:15 AM | ▲ |
| Ginsu Knife Set | International Collections | ✓ | 1 | Ship to... | 103.7 | KMTT | WA ▼ | Seattle | ▼ | 05/04/07 7:45 AM | |
| 2 Minute Abs | 2 Minute Abs | ✓ | | | 98.5 | KDRK | OR ▼ | Portland | ▼ | 05/04/07 9:02 AM | |

Contributions  670

| Campaign Name | Organization | DONATE | $ Amount | Radio Station | | State | City | | Date & Time | |
|---|---|---|---|---|---|---|---|---|---|---|
| Destination Joy | Make a Wish Foundation | ✓ | | 103.7 | KMTT | WA ▼ | Seattle | ▼ | 05/04/07 6:15 AM | ▲ |
| Blue Angel Memorial... | Make a Wish Foundation | ✓ | 200.00 | 103.7 | KMTT | WA ▼ | Seattle | ▼ | 05/04/07 7:45 AM | |
| Fund a Vision | YMCC | ✓ | | 101.5 | STAR | WA ▼ | Seattle | ▼ | 05/04/07 9:02 AM | |

Order Details
By Vendor

This is where description text goes this is for placement this is just for placement only this is just for Step 1    ▲ Step 2
Select: Theme    Review & Purchase

Downloads: iTunes    700

| Item | Artist/Author | | Format |
|---|---|---|---|
| ALBUM | The Joshua Tree | U2 | iTunes ~702 |
| SONG | Crash | Dave Mathews Band | iTunes ~704 |
| TRANSCRIPT | Living in a War Zone | 94.9 KUOW | iTunes ~706 |

[Cancel]    [Proceed to Download] — 710

Products: Amazon    750

| Item | QTY | Ship To | Shipping Speed | Price |
|---|---|---|---|---|
| Under the Table and Dreaming - Audio CD - Dave Mathews.... | 1 | Janice Johnson | 2-3 day | $11.99 |
| Under the Table and Dreaming - Audio CD - Dave Mathews.... | 1 | John Doe | Next Day | $11.99 |

[Cancel]    [Proceed to Checkout]

Products: Qüü    760

| Item | Vendor | QTY | Ship To | Shipping Speed | Price |
|---|---|---|---|---|---|
| Ginsu Knife Set - International Collections | Walmart | 1 | Janice Johnson | 2-3 day | $28.99 |

[Cancel]    [Proceed to Checkout]

Contributions    770

| Campaign | Amount |
|---|---|
| Blue Angel Memorial - Make A Wish Foundation | $200.00 |

[Cancel]    [Confirm Contributions]

FIG. 7

REAL-TIME REMOTE PURCHASE-LIST CAPTURE SYSTEM

RELATED APPLICATIONS

This application claims priority from U.S. Provisional Application No. 60/865,585 filed Nov. 13, 2006 and incorporated herein by this reference in its entirety.

TECHNICAL FIELD

This disclosure relates to user interactions with radio broadcasting and, more specifically, to enabling a radio listener to quickly and easily capture data, anytime and anywhere, that identifies an item of interest that was broadcast over the airwaves, so as to support subsequent actions with respect to the identified item of interest to the listener, such as an online purchase.

BACKGROUND

Since its inception, the radio has evolved in terms of technology and quality of sound, but not in terms of becoming interactive. People frequently are exposed to music, a program or an advertisement playing over broadcast radio or the like, while at home, on the beach, in the car, etc; or they might like to donate to a radio station or a charitable cause or even vote on a song or a poll being conducted on the air. These actions may be inconvenient or impossible, depending on the user's current location and activity, for example driving a car. Some states and localities have imposed limitations on the use of cell phones, for example, while a user is driving.

Sometimes, the radio listener (hereinafter called the "customer" or "user") hears advertisements played over broadcast radio or the like at various locations where is may be inconvenient to make a note of the product or service being advertised. If the customer does not have an immediate access to the information, or cannot store that information, there will be a protracted delay between the time when they are initially exposed to the advertising and develop interest in the product or service, and the time where they actually have the opportunity to act on that interest. When they do finally have the opportunity to purchase the product, their impulse to purchase may have diminished or they may not even remember the name of the advertiser, product or service that they wish to purchase. The immediacy of the information and their interest has waned, and therefore the sale is lost.

Sometimes the listener would like to donate to a cause or a radio station, and he is driving or may be in an inconvenient location to call or access the online site and act upon their desire. At a later stage, their impulse to donate may have diminished or they may not even remember the number they would have to call to donate. The immediacy of the information and their interest has waned, and therefore the donation is lost.

Similarly, the user frequently likes the song or the program he is hearing and would like to purchase that track or the album or a copy of the transcript but he is where is may be inconvenient to make a note or cannot later remember the name of that song or program. Thus there will be a protracted delay between the time when they are initially exposed to the song or program and develop interest in the product, and the time where they actually have the opportunity to act on that interest. When they do finally have the opportunity to purchase the product, their impulse to purchase may have diminished or they may not even remember the name of the item they wish to purchase. The immediacy of the information and their interest has waned, and again a potential sale is lost.

What is needed is a way for a customer to immediately and easily capture the relevant information in response to hearing programming content or advertisements, so that at a later stage when they have access to a computer or wireless access to a network, they can examine the automatically identified product and purchase the desired product or service with a simple action that does not require web surfing or internet research.

SUMMARY

One aspect of the present disclosure provides a method of real time remote purchase-list capture. In one presently preferred embodiment, the method includes receiving an activation instruction from a user. This can be done, for example, by a simple button press on a portable capture device. In response to the activation, the method calls for determining a current frequency setting of a radio receiver located adjacent to the user-controlled device. This frequency setting is useful to identify the radio station to which the user is listening at the time of activation. A time stamp also is captured.

Another feature of the invention is a system for determining a frequency setting or a radio receiver through the use of a transmission that incorporates a predetermined audio frequency signature in a feedback loop. The method further includes identifying a corresponding broadcast channel (radio station) based on the current frequency setting of the receiver, or based on recovered metadata. Based on the radio station identity, and the metadata that might include the time stamp, the method identifies what occurred on that station broadcast at that time. For example, a song (music track) that was played, a news or "talk show" program, a product or service advertisement, a real-time "call in" voting poll, or perhaps a solicitation of donations. These examples of radio programming content are provided by way of illustration and not limitation. Depending on the type of content, the user may want to take further actions, such as buying a product, a music track, or a vacation package; casting her vote in a poll, obtaining a transcript, etc.

In one embodiment, the captured data is uploaded to a remote server, which determines and presents the programming information to the user in an interactive interface, for example a web site. Interacting with the web site, the user can make final decisions or confirmations of her actions, and they are executed immediately. This removes the burden of the user having to search, shop or surf the internet to find the items that she heard about on the radio.

Additional aspects and advantages will be apparent from the following detailed description of preferred embodiments, which proceeds with reference to the accompanying drawings.

BRIEF DESCRIPTION OF THE DRAWINGS

FIG. 6 is an example of an interactive display screen layout generated by a server for a client user to select items previously identified by the user's capture device or cell phone application consistent with the present disclosure.

FIG. 7 is an example of an interactive display screen layout generated by a server for a client user to purchase selected items.

DETAILED DESCRIPTION OF PREFERRED EMBODIMENTS

A. System Overview

Figure 1:
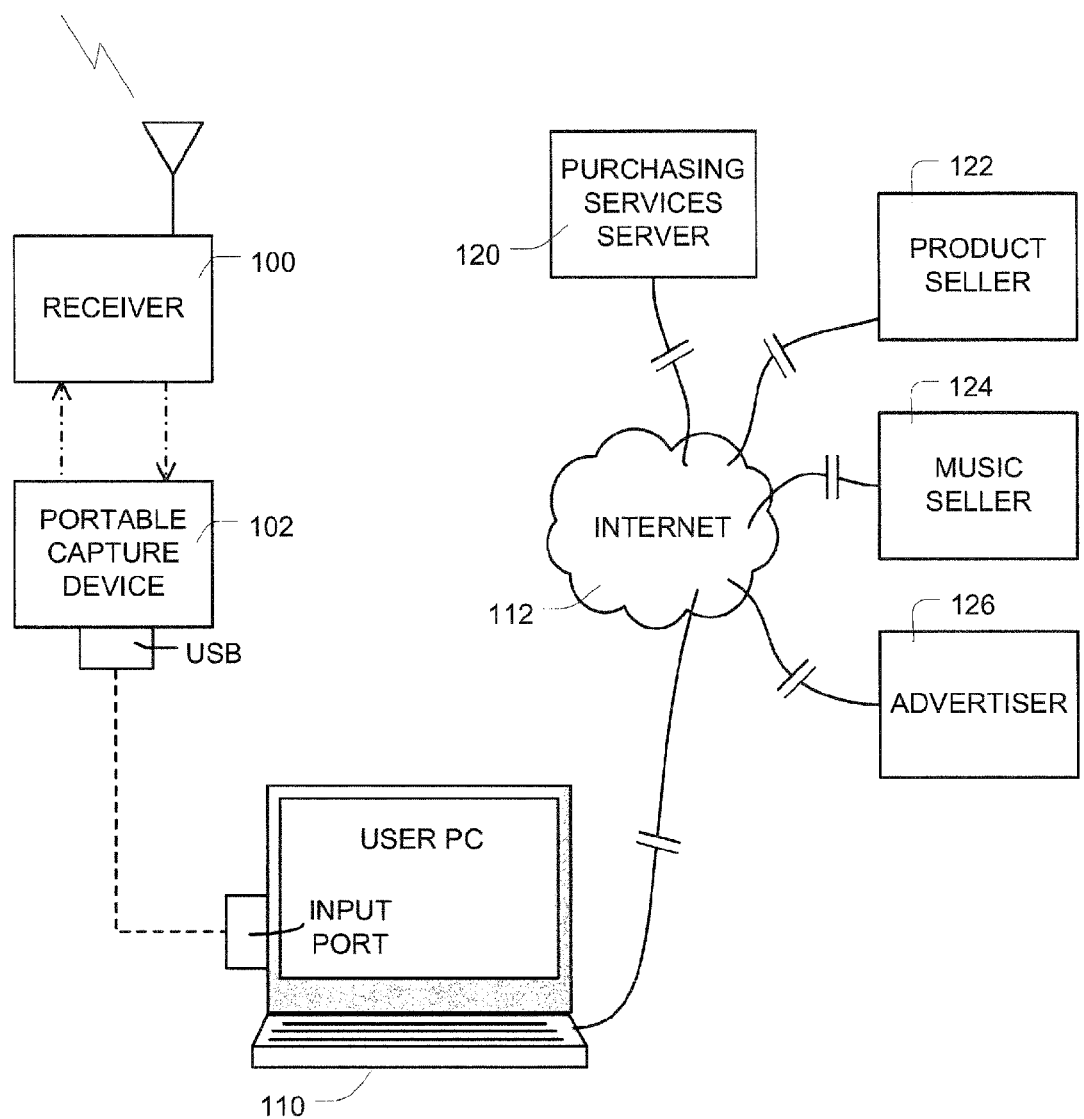
FIG. 1 is a simplified system overview of one example of a real time remote purchase list capturing system utilizing a portable standalone capture device.

When a customer hears an advertisement, a radio program or a music track on a radio, or would like to donate for a charitable, civic or educational cause or a radio station, utilizing one aspect of the present disclosure, they simply press the pertinent button on their portable capture device (the "PCD") or, in accordance with another aspect of the present disclosure, they can invoke a "quick purchase" application on their cell phone and press the pertinent button. The term "cell phone" is used herein broadly to include, without limitation, all portable wireless communication devices, such as cell phones, iPhone, Blackberry, etc. that can transfer voice or data over a wireless telecommunication network.

In one embodiment, there are a minimum of three buttons on a portable capture device; one for music, one for ads, and one for transcripts and donations as described in detail later in this document. These features are described by way of illustration and not limitation. The term "button" is used herein broadly to include without limitation conventional push-button or electromechanical switches, electrostatic devices, "soft keys" on a display, etc. A "button" may be implemented as a response to voice activation as well. Any of these can be used to activate the capture device, i.e., trigger it to capture current data as further described shortly. The portable capture device, in one embodiment, identifies the radio station being listened to at the time the device is activated, and stores that information in memory. Later, when the PCD is plugged into an I/O port of a computer, for example a USB port, it transmits station identifying information along with the metadata to a remote Purchasing Services Server, along with a unique key identifying the customer (or the customer's capture device). The Purchasing Services Server, also referred to by applicant's trademark "Emo-V Services," authenticates the transmission and displays the items the user had "captured" earlier in different categories, for example: music, products, donations and transcripts. The server determines the corresponding items by accessing or searching station logs provided by the broadcasters or by third parties. The user can browse the selection for more details such as listening to the song or looking at the advertised product picture and description, decide whether they want to purchase or receive additional information, or determine the amount they would like to donate, and finalize their selection by un-checking or deleting products they would prefer not to purchase.

The selected products are then categorized by vendor depending on the user's preferences captured during the registration such as Amazon as a preferred online retailer or iTunes as an online music store. If the advertised product is "PCD-enabled" the user can choose to request additional information from the vendor or purchase the product. The request for information or the purchase order are made automatically by the server without further action required by the user. The user can then proceed to the final step by clicking on the checkout button related to each vendor. The products are then displayed in the vendor's shopping cart. If the user does not have a preferred vendor, Emo-V Services could propose that purchases be made from the lowest priced participating vendor. If the product is a consumable good, the vendor ships the product to the customer's address as in a traditional online purchase. If the product is digital media such as an e-book or music, the vendor sends the customer an e-mail with information on how to download the media or open the relevant application such as the iTunes download. Emo-V Services also sends the customer an e-mail indicating the status of their order.

B. Capture Device

A portable capture device is provided to capture the broadcast frequency or channel of the radio or satellite radio the consumer is listening to, and the time of activation. This information is used to identify the song/programming/advertisement that the customer is receiving when the capture device is actuated. In a presently preferred embodiment, the capture device has a few input buttons, to make operation very fast and simple. For example, it may have one button designated to "GET Ad" Or "PRODUCT." The user presses that button, or otherwise activates the device, in order to capture and store the information about a product being currently advertised (or last played) on the radio, as further explained below.

To identify the radio station (broadcaster) currently playing, the capture device finds the frequency of the current broadcast as follows. It has an on-board, low-power radio transmitter. That transmitter broadcasts only up to a few meters. The audio portion or "content" being transmitter is a simple audio tone, or a series of say three or four tones, that forms an audio "signature." That signature preferably is very short, perhaps 500 msec total duration. The on-board FM transmitter sweeps over the usual range of FM broadcast carrier frequencies, e.g., approximately from 87.5 to 107.7 MHz. A sweep over that range should be completed in a few seconds, although the sweep speed is not critical. The point is to take only a short time to acquire or "detect" the frequency to which the radio is currently tuned to.

When the sweep frequency equals the current radio setting, the radio will receive the nearby low-power FM broadcast, and thus receive the audio signature carried in that broadcast. The audio signature will "play" through the speaker(s) along with the other programming. The capture device also includes a microphone to detect the "audio signature" when it is played. Detection of that signature indicates that the current FM broadcast frequency of the sweeping transmitter is the receive frequency to which the nearby radio currently is set. Again, the audio signature is short enough to be unobtrusive to the user/listener.

FIG. 1 is a simplified overview of one example of a real-time remote purchase list capturing system utilizing a mobile stand-alone capture unit. In this drawing, a receiver 100 is typically a radio receiver, and may be a portable unit or one installed in a motor vehicle. It may be, for example, a satellite digital radio, a terrestrial digital radio, or a conventional analog radio. For the present illustration, we will assume that it is an FM radio or one that includes capability to receive on FM frequencies. A portable capture device 102, described in greater detail later, comprises a small, battery-operated device that may be carried by a user. Conveniently, it may be implemented as a key fob. We assume that the portable capture device 102, for the present discussion, is located within a few feet of the receiver 100. So, for example, the user of the portable capture device may be the driver or a passenger in the motor vehicle where receiver 100 is installed. When content of particular interest is playing on the radio, for example a music track (a song), the user can activate the portable capture device 102 to capture information that can be used to purchase the song then playing.

For example, in one embodiment, the capture device 102 will determine the current frequency setting of the receiver 100, as well as the RDBS (Radio Broadcast Data System) data broadcasted at that frequency. The portable capture device 102 stores this information in an internal memory. The information fields provided by the RDBS may include, for example, clock time, a unique station identifier (with country code prefix), program type, "radio text" (free form text message), etc. In some cases, the radio text may identify a current music track while it is played. Which fields are decoded will vary from one receiver to another. In some cases, a music track (song) identifier is provided in the RDBS data.

Later, after the user has returned to her home or office, or otherwise has access to a computer, the user can access remote purchasing services, as explained later, for example, a services server coupled to a communications network. Such a server may be accessed via wired and or wireless networks. In one presently preferred embodiment, the user accesses the services server via the Internet. The capture device has a memory, for example flash memory, on which resides a device application program that automatically manages the device operations in conjunction with an on-device processor (illustrated in FIG. 4 as onboard processor 445). For example, the device application program can be arranged to launch automatically when the capture device is plugged into a USB port on the user's home, office or other computer, and it downloads the stored information from the portable capture device memory into the computer (illustrated in FIG. 1 as computer 110). The program then auto-deletes the data from the device without having to wait for any signal from the remote Services Server.

In one embodiment, the portable capture device may have a USB port, or other standard port, wired, wireless, infrared, etc., which can communicate with a corresponding port on the computer 110 (or with the server as explained later in this document) for the purpose of downloading the stored capture data. Of course, the user may have activated the capture device, as described above, multiple times and each time it is activated, the corresponding capture data is stored in the memory, and all of that data can be downloaded to the computer 110 whenever convenient, automatically or manually.

As noted, the computer 110 has access to the Internet 112. A remote Services Server 120 provides various services to the user, and to others, as further explained below. In the present example, we assume that the user has "captured" data associated with one or more advertisements and music tracks, as described above. After the capture data is downloaded to the computer 110, it communicates with the purchasing Services Server 120 in order to facilitate purchasing the music tracks or the products of interest to the user.

As mentioned, in other embodiments, the portable capture device can be coupled to a portable communication device, such as a cellular phone, an iPhone or Blackberry device which is capable of communicating with a remote network and a server coupled to the network. In that case, no separate computer is required. In still further embodiments (not shown), the disclosed capture functionality may be provided in a software application deployed in a cell phone, "smart phone" or the like, iPhone, Blackberry, etc. Depending on the particular device, supplemental hardware may be needed. In other cases, "software radios," audio circuitry and such on board a multi-function portable device may provide adequate functionality, subject to appropriate programming in view of the present disclosure. When the user accesses the Services web page on their computer (the same page that opens when the user inserts the mobile capture device in the USB port or when they use their cell phone application) they see the information related to all the items they had "clicked on" and can proceed to purchase or request additional information as if they had used the mobile capture device.

Turning now to FIG. 6, this shows an example of a screen display layout that is generated by the purchasing services server 120 for a particular user (we assume that the user has logged into the server with appropriate credentials such as a user name and password). Referring to FIG. 6, a first portion of the screen display 600 includes a listing of the music tracks, advertised products, donations and transcripts identified by the capture data that was initially stored in the portable capture device 102 and then downloaded to the computer 110. The computer 110 includes appropriate application software for communicating with the purchasing services server as shown on FIG. 1. In the screen display of FIG. 6, the first line in section 600 shows data for a song entitled, "I Still Haven't Found . . . ." This shows that the song is available for purchase (as distinguished from the album which is grayed out), and it shows the radio station, state, city, date, and time when the song was played. That data corresponds to the data that was captured by our illustrative user, using a portable capture device, who was in the car traveling when the song was played. Using this user interface, or something similar, the user can review the songs associated with the data that was captured, and make decisions as to what items to purchase or not purchase. After the user has completed the review, and is ready to purchase selected items, she may interact with a screen display along the lines illustrated in FIG. 7.

In FIG. 7, a first region 700 shows various downloads that were previously selected by the user from among those identified based on the capture data. In this example, a first line 702 of the region 700 shows an album called "The Joshua Tree" by the artist U2 available in iTunes format. The next line 704 shows a song called "Crash" by the Dave Matthews Band also in iTunes format. The third line 706 shows a transcript of a radio program called "Living in a War Zone" which is available from radio station 94.9 KUOW also in iTunes format. In one embodiment, after the user makes her selections, referring to FIG. 6, the user may designate certain preferred vendors, in connection with the user setup procedures, described later. Once a user's selections are finalized, the user can simply press the button marked for example 710 "Proceed to Download" to complete the purchase. When the button 710 is asserted, the server 120 will forward the completed order directly to iTunes, or whatever the selected vendor may be, and the purchase is completed. In this way, the user avoids actually "browsing" or "shopping" on the target vendor site. The selection of the desired items has already been done by the server software, again based on the capture data discussed earlier. The purchasing of other items such as products and contributions to charitable entities shown in FIG. 7 are also described in more detail later.

Referring once again to FIG. 1, a music seller 124, such as the iTunes web site, is shown as coupled to the Internet 112 to carry out the purchasing methodology just described with reference to FIGS. 6 and 7.

Figure 2:
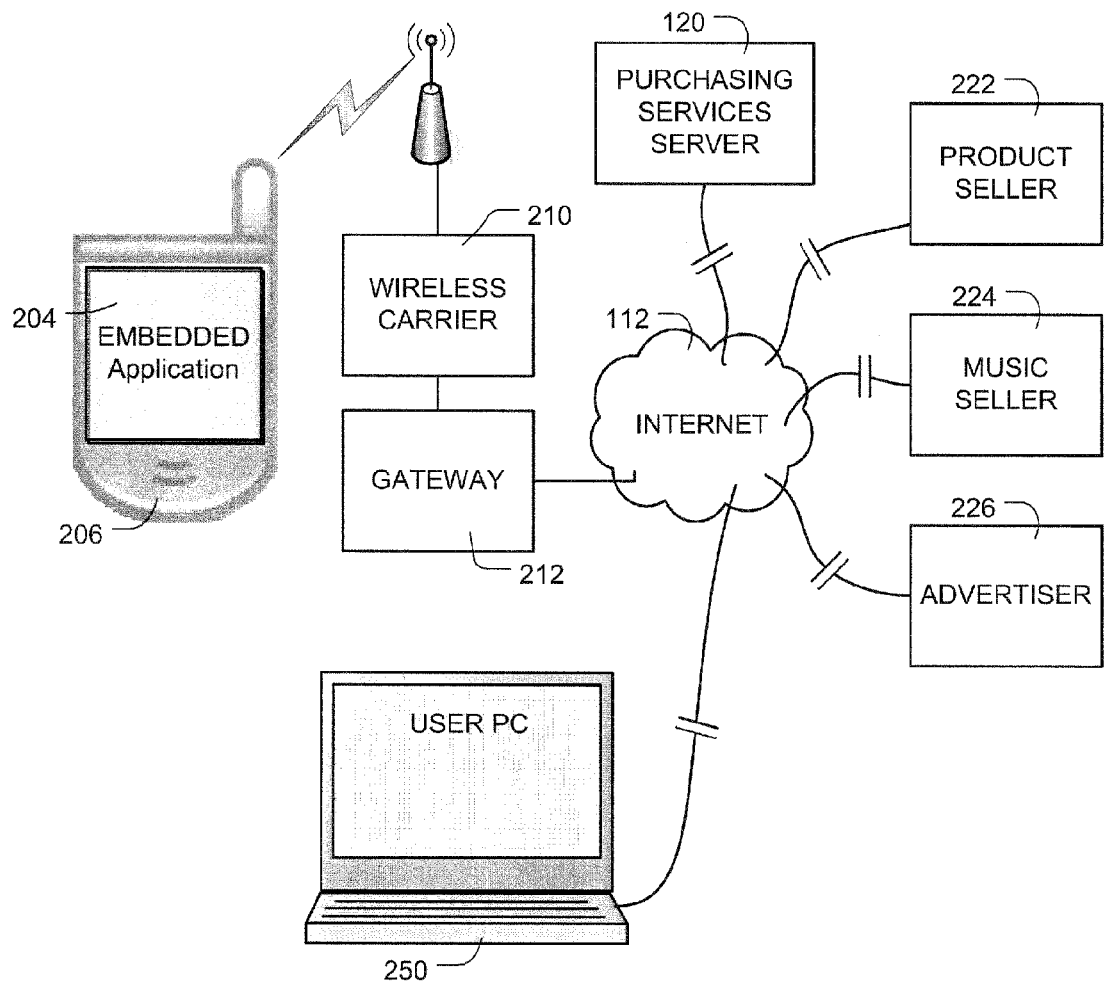
FIG. 2 is a simplified system overview of a second example of a real time remote purchase list capture system utilizing a cellular phone application.

FIG. 2 is another simplified high-level diagram of a second example of a real-time remote purchase list capturing system. This diagram is similar to that of FIG. 1, except that, in this case, instead of a stand-alone capture device 102 (in FIG. 1), an application for data capture 204 is installed on a cell phone 206. The cell phone 206 is capable of communicating with a wireless telecom carrier 210. In this implementation, cell phone 206 in combination with embedded software 204 can be used to capture interest data, as described above with regard to the portable capture device 102, and then transmit that capture data via the wireless telecom system, through SMS or other methodologies such as MMS or web-services, to the purchasing services server 120. In the case of the cell phone application, other functions can be implemented as the usage is not limited to the number of buttons on the device. For example buttons that allow the user to vote yes or no on a question being asked can be implemented by a simple change of configuration. Voting capability from the cell phone is reflected in near real time in reports available to the radio stations or the pertinent party. Then, as before, once the user arrives at a location where she has access to a computer 250 in FIG. 2, she can proceed to interact with the purchasing services server 120, using interactive screen displays of the type illustrated in FIGS. 6 and 7 to make her selections and complete desired purchase list.

Operation of the Capture Device

Figure 3A:
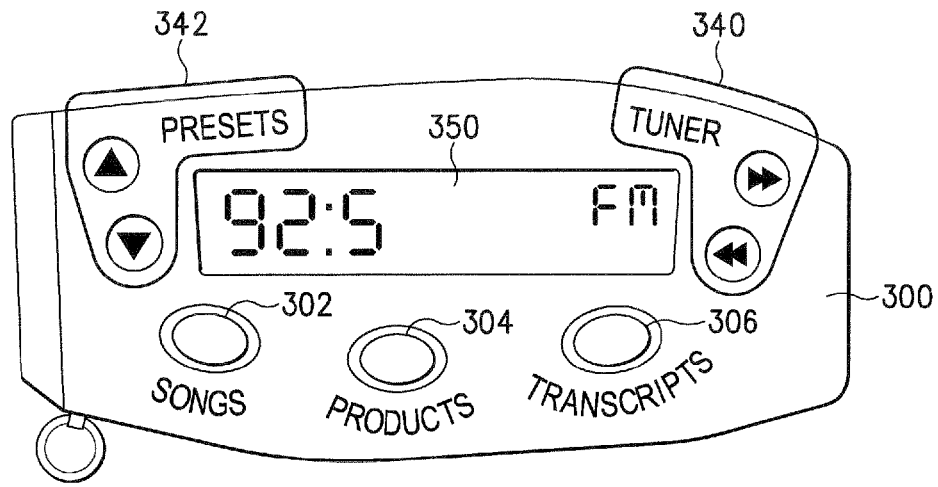
FIGS. 3A, 3B, 3C, and 3D show one embodiment of a portable standalone capture unit in front, left, right and rear side views, respectively.
Figure 3B:
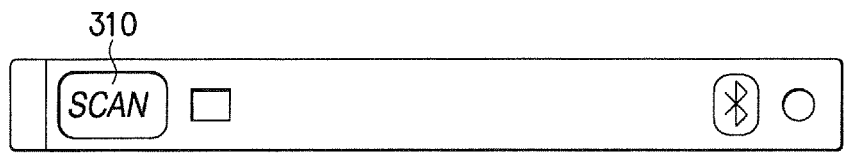
Figure 3C:
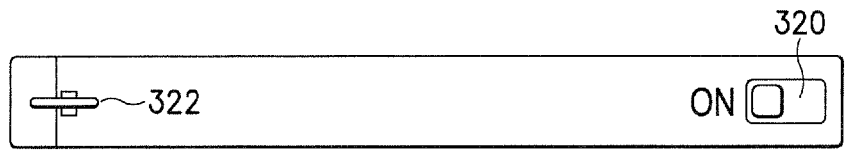
Figure 3D:

Turning now to FIGS. 3A-3D, one embodiment of a mobile stand-alone capture unit 300 is illustrated in front. FIG. 3A shows the front side of one embodiment of a portable stand-alone capture unit. FIGS. 3B, 3C, and 3D show the capture unit in rear, left-side, and right-side views, respectively. Referring to FIG. 3A, in a preferred embodiment, the portable capture unit measures only a few inches in length, and can be used as a key fob so that it will be available to the user as needed, especially when the user is traveling in a motor vehicle, aircraft or other conveyance. The capture unit 300 preferably is battery-powered, and requires no external power source. In one embodiment, the capture unit 300 has three operating buttons, labeled something like "Songs" 302, "Products" 304, and "Other" 306 in the drawing, although the exact labels are not critical. Symbols or icons may be used in addition or in lieu of text. In operation, when the user hears the song playing that she wishes to purchase, she simply pushes the button 302 to activate the capture unit. In response to that activation, the capture unit 300 detects the current frequency setting (or station) of a nearby radio receiver, such as the radio in a motor vehicle in which the user is riding. Examples of specific circuits and methodologies for determining the current frequency setting are discussed below.

In addition, the capture unit 300 includes a digital memory (not shown) for storing the captured activation time and the determined current frequency setting of the nearby radio. In addition, the capture unit 300 preferably includes an RF receiver for capturing and decoding RDBS data. This stored information will be used subsequently to determine the name of the song that was playing when the capture unit 300 was activated. In this way, the present system enables a customer to purchase products (or arrange for the purchase of products) with a single-button click from virtually anywhere at any time, and in particular immediately upon hearing an advertisement for a product on the radio, or hearing content of particular interest. That content may be a song (music track) or other types of programming such as, for example, a news summary or editorial commentary. For these types of content, the user may want to purchase a transcript (in printed, electronic, or other form).

Referring again to FIG. 3A, in the situation where the user wishes to purchase a product that was featured in a radio advertisement, the user once again need only press a single button, namely the "Products" button 304 in FIG. 3A. Similarly, if the user hears a news summary, panel discussion, or other primarily verbal presentation, the user can initiate purchase of a transcript simply by pressing the "Other" button 306. Similarly, if the user wishes to donate to a radio station, a program, or other cause, the user can initiate the donation simply by pressing the "Other" button 306. In all four examples, the capture unit 300 will operate in a similar fashion to determine the current frequency setting or station to which the radio is tuned and the ID of the button that is pressed. As before, this information is stored in a local digital memory.

FIG. 3C illustrates the opposite side of one embodiment of a capture unit. This figure shows a power switch 320 and an attachment for a key ring or the like 322. FIG. 3D shows the back side of one embodiment of a capture unit 300. In this embodiment, a connector, for example a USB connector 330 is shown for the purpose of downloading the stored capture data to a computer or similar device. In the illustrated embodiment, the USB connector 330 is arranged to slide in and out of the capture unit by operation of a thumb actuator 332. In other embodiments, the capture unit may be configured with a wireless communication capability, for example Bluetooth, in which case a physical connection such as a USB port is not required to download the stored capture data. Other embodiments of a portable capture unit may include wireless communications systems that allow the device to communicate in real-time with the server, without requiring further communication with the personal computer. In this case the user logs in the "Myquu.com" or similar page and accesses the data that was stored. Other embodiments of a portable capture unit may provide different appearance or interfaces; the illustrated embodiment is merely illustrative.

FIG. 3A also illustrates tuner controls 340 and presets control 342. These controls are optional and are not required in some embodiments. These controls, where implemented, would enable the user to manually set the capture unit to a particular radio station in the event that the internal frequency detection circuit (described below) is unable to determine the current frequency setting of a nearby radio. The acquired frequency setting, whether it is acquired automatically or manually, may be shown in a display 350, although the display is optional. In other embodiments, an audible beep may be implemented to inform the user that the capture device has determined the current frequency setting of the nearby radio.

Figure 4:
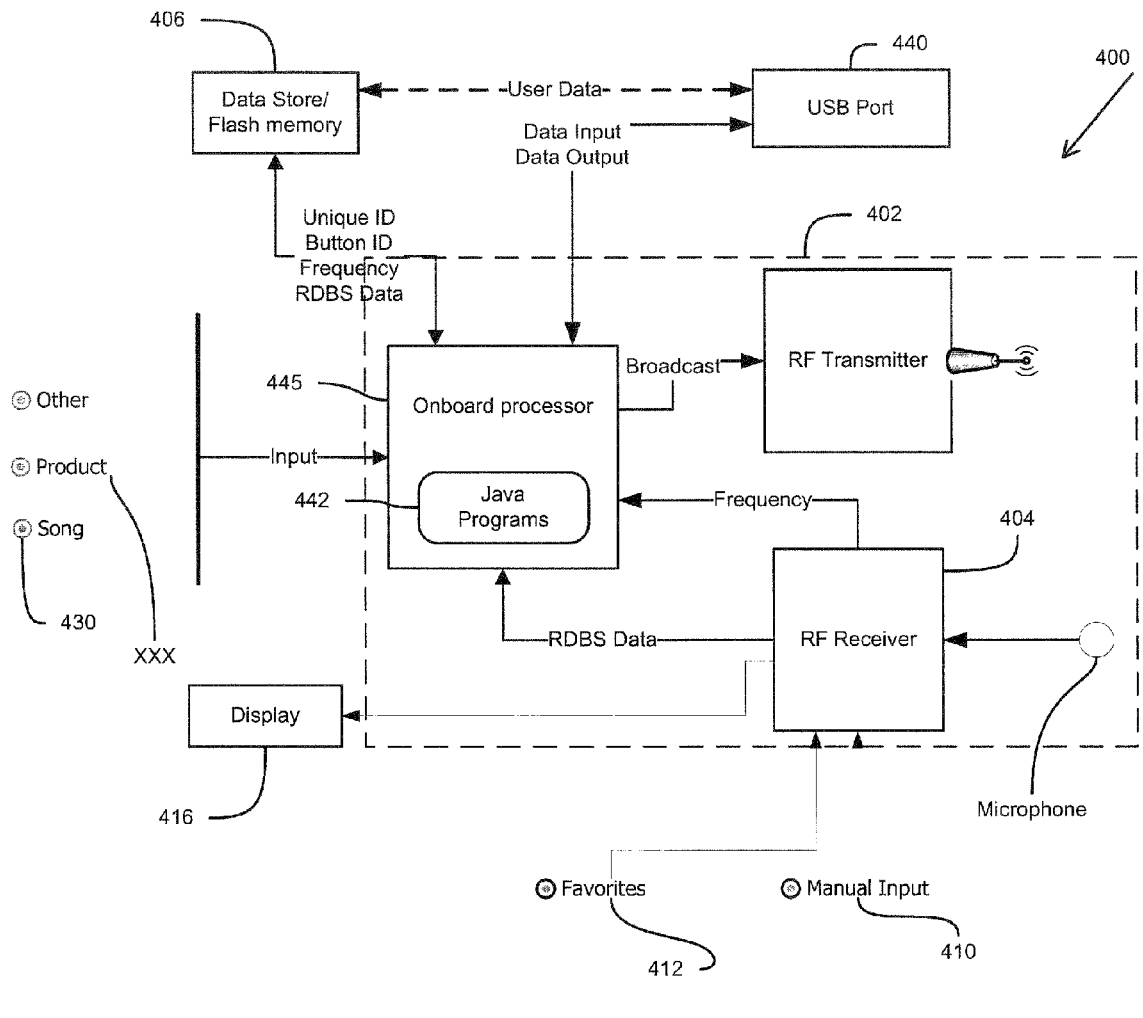
FIG. 4 is a simplified functional block diagram of one embodiment of a portable capture unit.

FIG. 4 is a simplified functional block diagram of one embodiment of a portable capture unit. The capture unit 400 shown in the block diagram of FIG. 4 may be the same, or may be a different embodiment, from the embodiments discussed above with reference to FIG. 3. In FIG. 4, a capture unit 400 may be implemented in various ways. For example, it may take the form of a portable capture unit as discussed above with reference to FIG. 3. In an alternative embodiment, the capture unit 400 may be integrated into a radio receiver or the like. In another embodiment, a capture unit 400 may be integrated into a portable remote control of the type commonly used with a television receiver. Referring to FIG. 4, the capture device includes an RF detector circuit 402, which detects the current frequency setting of a nearby radio. The frequency or station information is stored in a digital data store 406.

The radio receiver frequency (station) setting can be determined in any of several ways. First, as mentioned above, if the RF detector 402 does not succeed in getting a "fix" on the radio station, that information could be input manually to the capture device 400, as indicated by the manual tuning input 410. In the embodiment of FIG. 3A, these manual tuning inputs would correspond to the inputs 340. The circuit 400 can also include a manual favorites inputs 412, which in the embodiment 300 of FIG. 3 may correspond to the "presets" inputs 342. In any case, the FM receiver 404 can in one embodiment display the current frequency setting on a display such as the liquid crystal display 416.

The capture circuit 400 also includes a few buttons 430 such as the one labeled "Song" in the drawing, indicating that the user presses button 430 to provide an activation input to the capture device which, in turn, activates the RF detector 402 to capture the current frequency setting as discussed above. Other buttons labeled in the drawing "Product" and "Other" allow the system to identify the user's intentions. The capture circuit 400 of FIG. 4 may also include a clock integrated to the onboard processor 432 to capture the time when the song click 430 or other activation input is received. In some embodiments, the song click button 430 corresponds to the songs button 302 of FIG. 3A. In some embodiments, the clock circuit 432 can be omitted. For example, in the context of digital radio, where the radio signals from the broadcaster include embedded metadata that itself includes a time stamp, use of the clock circuit can be omitted Digital radio metadata also includes the station number or other identifier of the broadcast station. As indicated in FIG. 4, either the station ID metadata or the receiver frequency, as the case may be, are provided to the data store 406. The receiver frequency alone may not uniquely identify the station, as radio frequencies are reused in different geographic markets. However, where the station ID is not recovered from metadata or RDBS, the Services Server if necessary can determine the station based on the frequency, capture unit ID, history and other factors. The capture circuit 400 also includes, in some embodiments, a download port such as a USB port 440 for coupling the capture circuit 400 to a user's computer or the like. As noted, a wireless port can be implemented in some embodiments in addition to, or in lieu of, a physical connection such as a USB port. In some embodiments, the capture circuit 400 also includes executable program code 442 managed by the onboard processor 445 and storing the data in the data store 406 and configured for interaction with the user's computer via the USB port 440, or the like, for downloading the capture data described earlier.

Figure 5:
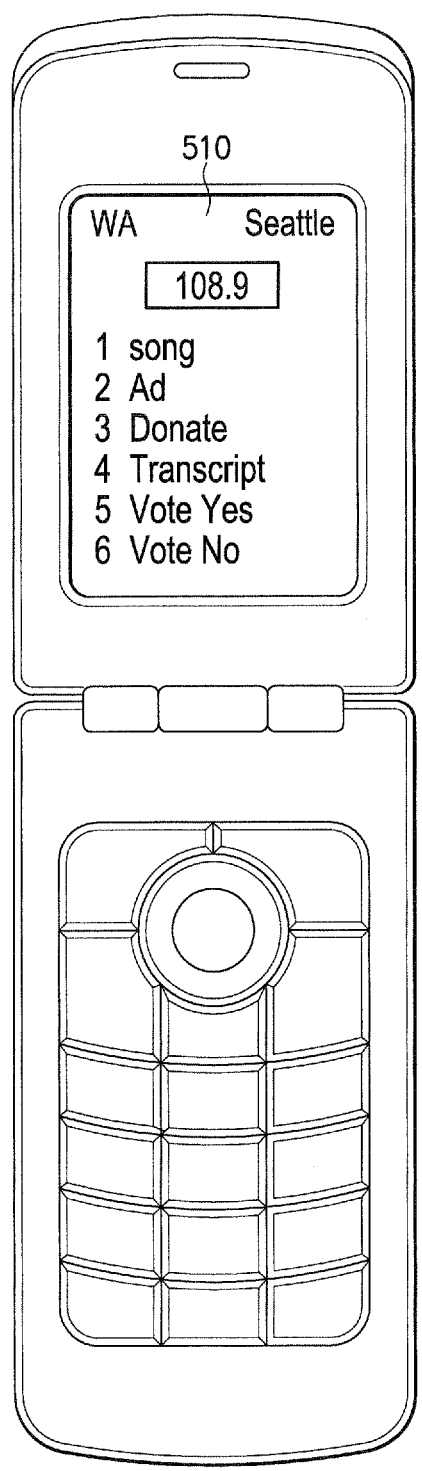
FIG. 5 is a front plan view of a cell phone, personal digital assistant (PDA), or the like showing one example of a screen display layout (user interface) implemented by a capture application program.

FIG. 5 is a simplified illustration in front view of a personal digital assistant (PDA), cell phone, or the like, showing one example of a screen display layout associated with an embedded capture system. In other words, in this implementation the capture system is implemented in part in client side software. In FIG. 5, an application program is deployed in a cell phone or other "smart" device with wireless communication capability for remote capture and related services as described herein. In this example, the application program (not shown but stored in memory) implements a display screen layout 510 that provides several functions. At the top, it shows the current city and state settings. These are used to access a stored database to look up radio stations in the selected city, based on the determined transmission frequency, also displayed (here "106.9 FM"). The frequency may be captured by capture circuitry (transmitter and receiver), as described above, or recovered from embedded metadata in the radio broadcast signal, or simply entered by the user. For user entry, the user can enter city and state, and then enter a frequency or just scroll through a list of local stations provided by the internal database. The database of local stations can be updated periodically using techniques that are known in other contexts. Favorite stations or "presets" can also be stored for easy retrieval. These may be especially convenient for stations where identifying information may not be available automatically.

The display 510 also presents options for various types of items the user may wish to "capture" and purchase or otherwise act on as appropriate. For example, the drawing presents user options to select a song, a product advertisement ("Ad"), a solicitation for a donation ("Donate"), a copy or transcript of a radio program ("Transcript"), or voting ("Vote yes" or "Vote no") in response to a live radio broadcast poll. The display shows a corresponding key or number for the user to press on the keypad to make the desired selection. The details of this interface are not critical. The functionality is dramatic as compared to prior art. For example, compare the effort and convenience of one key press to order a transcript, versus grabbing a pen and paper, while driving a car, to write down an address, then later writing a paper order, writing a check, and snail mailing the whole business to order a transcript (paper or electronic), which may take weeks to arrive. Using features of the present disclosure, the desired e-transcript may already have arrived in the user's computer when she arrives at the home or office.

In an embodiment where the device 500 comprises a cell phone, the wireless telecommunications network can be used for downloading the captured data to a server. That type of implementation is illustrated in FIG. 2, discussed above. In that embodiment, the wireless carrier 210 transfers the capture data via the Internet 112 to a purchasing services server 120. In other embodiments, where the capture data is downloaded to the user's computer (see FIG. 1), the capture data is again transferred via the Internet 112 to a purchasing services server 120.

The purchasing services server on a preferred embodiment implements a user interface, for example, along the lines of that illustrated in FIG. 6. FIG. 6 is an example of an interactive display screen layout generated by the server for a client user to select items previously identified by the user's capture device as discussed above. The particular layout of the interactive display of FIG. 6 can take various forms. In this illustration, the screen display includes a first portion 600 which displays music items identified by use of the capture data discussed above. For example, in the region 600, each line of the display corresponds to a song or music track (six of them are shown), and the display shows the radio station, state, city, date, and time at which that particular track was played, and the associated data was captured by the user.

A second region 630 of the screen display lists transcripts (two of them are shown) that were "captured" by the user. Again, the transcript was not literally captured, but the station identification and possibly RDBS data were captured, which, in turn, are used by the server to identify the particular transcript. Here, by using interactive checkboxes, the user has decided to buy a CD with the first transcript and to purchase an MP3 download with the second transcript.

A third region 650 shows a list of products that were identified as having been advertised when the associated data was captured. Again, the radio station, state, city, date, and time are shown. In this case, the user has elected to buy only the second of three items shown on the list.

And finally, a fourth region 670 of FIG. 6 lists some contributions that the user may decide to make; for example, to charitable organizations who had advertised or solicited donations on the radio and the user captured that information as described above. In this example, the user has decided to donate only to the second campaign shown on the display, "Blue Angel Memorial", and has elected to donate the sum $200 by filling in that amount in the box provided for that purpose.

To summarize, the screen display of FIG. 6 shows the user all of the items that were "captured" by the user, and enables the user to review the list, select particular items for purchase, or not, and otherwise complete necessary details in preparation for a purchase or donation or a request for more information on a product, as appropriate. After the user has completed this information, she can instruct the server to continue with arranging purchase of the items that were designated by the user for purchase. This may be done, for example, by pressing a continue button 680. The continue button may result in display of a user interface screen display similar to that shown in FIG. 7. Again, these interactive screen displays are generated by the purchasing services server 120 or the like, operational over the Internet or a similar public network using technologies such as HTML that are well known.

Referring again to FIG. 7, in some embodiments, the server system will take the selections made by the user interacting with FIG. 6, and then shop around via the Internet to find the best prices for the items selected by the user. This can be done transparently behind the scenes. In other embodiments, the system may default to purchasing selected items from vendors that the user selected in advance in the course of user setup preferences. Details of web site user setup, login procedures, and preferences are omitted because they are well known. After vendors have been selected for the purchases indicated by the user, the display screen of FIG. 7 shows the order detail arranged by vendor. In the first section 700, the vendor is iTunes and three items have been selected. If these are correct, the user can simply press a button 710 "Proceed to Download" and the download will occur. In this case, there are three downloads. In a second region 750, the display screen shows the products selected for purchase from amazon.com. In this case, there are two audio CDs already selected for purchase. The user need only press the button to proceed to checkout. The next region 760 shows a product (Jinsu Knife Set) to be purchased from WalMart. Shipping information and pricing are shown, Finally, a region 770 in the screen display shows the campaign to which the user elected to make a donation of $200. The user need only press a single button to confirm the contribution. Again, the user setup in Preferences may be used to establish the method of payment.

It will be obvious to those having skill in the art that many changes may be made to the details of the above-described embodiments without departing from the underlying principles of the invention. The scope of the present invention should therefore, be determined only by the following claims.

The invention claimed is:

1. A processor executable program code storable in non-transitory machine-readable memory, the program code comprising:
   first code to receive a user activation comprising an activation type identifier corresponding to a product, a song or service, or combination thereof in response to a radio transmission comprising broadcast programming played in a radio station;
   second code to access a local database for identifying the radio station based on user input, wherein the user may select a currently displayed city and state setting, or enter city and state, and then the local database is accessed to identify a radio station located in the selected or entered city, based on a determined transmission frequency, wherein the transmission frequency is determined by one of (a) captured by capture circuitry, (b) recovered from embedded metadata in a radio broadcast signal, and (c) entered directly by the user;
   third code for storing a station identifier associated with the radio station in a memory for use in identifying the product, the song or service, or combination thereof for a subsequent on-line transaction associated with the product, the song or the service;
   forth code to transmit a message containing the station identifier, identifier of the user, and an indication of the activation type to a remote server; and
   fifth code configured for interacting with the remote server to identify at least one of an advertised product, a transcript of a transmitted program, a solicitation for a donation, and a real-time voting poll in response to the indication of the activation type, and completing a corresponding electronic transaction without additional user input.

2. The application program according to claim 1, further configured to determine a station identifier of a nearby radio by extracting metadata from a received radio transmission.

3. The application program according to claim 1, wherein the received radio transmission is an FM broadcast and the application program extracts RDBS (Radio Broadcast Data System) data from the received radio transmission.

4. A system for acting on items identified in a radio transmission comprising:
   a client device, the device configured to:
   receive a user activation comprising an activation type identifier in response to programming played in a radio station during the radio transmission, wherein the activation type identifier is selected from a plurality of activation type identifiers including activation types for music, advertisement, transcripts, donations and voting responsive to a live radio broadcast poll;
   identify the radio station based on a determined transmission frequency of the radio station;
   store the activation type identifier and a radio station identifier associated with the radio station in response to the user activation; and
   send the activation type identifier, data identifying the device or the user, and the radio station identifier in response to the user activation to a purchasing services server via a communication network to cause the purchasing services server to identify items associated with the activation type identifier, wherein
   the purchasing services server is arranged to implement an interactive user interface; wherein the interactive user interface includes a screen display layout listing of the items identified in response to the data received from the client device, the screen display listing including an indication of the corresponding radio station and broadcast date and time of each item and the interactive user interface enables the user to select one of the identified items and take further actions with respect to the selected item.

5. The system of claim 4 wherein the screen display listing of the items identified in response to the data received from the client device includes a listing of music items, transcripts, products, contributions.

6. The system of claim 5 wherein:
   the screen display listing of music items presents an option to purchase a selected song title; and
   responsive to a purchase selection in the music screen display, the purchasing services server automatically creates a corresponding purchase request on behalf of the user, and forwards the purchase request to a vendor previously selected by the user where the user has an account.

7. The system of claim 5 wherein:
   the screen display listing of transcripts presents an option to the user to select and purchase a selected transcript.

8. The system of claim 5 wherein: the screen display listing of contributions presents an option to the user to donate a selected amount of money to a selected campaign.

9. The system of claim 5 wherein the screen display presents a listing of orders created by the server responsive to user selections, and the screen display presents an option for the user to confirm each purchase request or contribution.

10. The system of claim 5 wherein the client device comprises a portable capture device having at least three buttons, namely, one for music, one for advertisements, and one for transcripts and donations.

11. The system of claim 5 wherein the capture functionality is implemented in a software application deployed in a smart phone, and the smart phone application implements a screen display layout that:

identifies the broadcast radio station; and presents options for various types of items the user may wish to act upon, the user options including a single key press to order a transcript of a radio program.

12. A method comprising:

receiving an activation instruction from a user-controlled device, wherein the activation instruction is associated with a particular type of transaction including at least one of the following: a product purchase, a service purchase, a donation, a vote, a transcript request or other advertised item, or combinations thereof, and the activation instruction includes a time stamp;

receiving a current frequency setting of a radio receiver;

identifying a corresponding transmission channel based on the current frequency setting of the radio receiver;

identifying the particular type of transaction associated with the received activation instruction, wherein said identifying includes:

acquiring data corresponding to the product purchase, the service purchase, the donation, the vote, the transcript request or the other advertised item, or combinations thereof associated with the received activation instruction and the identified transmission channel; and identifying the product purchase, the service purchase, the donation, the vote, the transcript request or the other advertised item, or combinations thereof featured on the identified transmission channel;

and automatically executing the particular type of transaction.

13. The method according to claim 12, further comprising: acquiring metadata, wherein said acquiring metadata comprises demodulating the metadata from the channel transmission, wherein identifying a product purchase, the service purchase, the donation, the vote, the transcript request or the other advertised item, or combinations thereof includes analyzing the metadata.

14. The method according to claim 12, further comprising transmitting indicia that identify a determined product to a remote services server for electronic purchase of the determined product.

15. The method according to claim 12, wherein the product featured on the corresponding transmission channel is a music track that was played on the transmission channel at substantially a same time that the activation instruction was received.

16. The method according to claim 12, wherein the product featured on the corresponding transmission channel is a product that was advertised on the transmission channel at substantially a same time that the activation instruction was received.

17. The method according to claim 12, wherein the product featured on the corresponding transmission channel is a charitable donation that was solicited on the transmission channel at substantially a same time that the activation instruction was received.

* * * * *